United States Patent
Wu

(10) Patent No.: US 6,812,871 B2
(45) Date of Patent: Nov. 2, 2004

(54) EXTENSION UNIT FOR PLC SYSTEM AND I/O CONTROLLER THEREOF

(75) Inventor: Hung-Chih Wu, Taipei (TW)

(73) Assignee: Delta Electronics Inc., Taoyuan Sien (TW)

(*) Notice: Subject to any disclaimer, the term of this patent is extended or adjusted under 35 U.S.C. 154(b) by 0 days.

(21) Appl. No.: 10/617,814

(22) Filed: Jul. 14, 2003

(65) Prior Publication Data

US 2004/0189495 A1 Sep. 30, 2004

(30) Foreign Application Priority Data

Mar. 27, 2003 (TW) ......................................... 92106922 A

(51) Int. Cl.[7] ................................................ H03M 7/00
(52) U.S. Cl. ......................... 341/99; 341/155; 341/144
(58) Field of Search ........................... 341/99, 118, 155, 341/144

(56) References Cited

U.S. PATENT DOCUMENTS 6,384,753 B1 * 5/2002 Brooks et al. .............. 341/118
6,448,920 B1 * 9/2002 Webster et al. ............. 341/155
6,744,393 B2 * 6/2004 Breinlinger ................. 341/155

* cited by examiner

Primary Examiner—Jean Bruner Jeanglaude
(74) Attorney, Agent, or Firm—Birch, Stewart, Kolasch, & Birch, LLP

(57) ABSTRACT

An input/output controller for an extension unit of a programmable logic controller (PLC). The input/output controller has a first port connected to the PLC and a second port connected to a terminal device of the extension unit. A memory is provided to save data received from the first port and the second port. A mode-selecting circuit of the input/output controller includes a plurality of preset operation modes, which determine the input or output type of the first and second port, data-transmitting format used by the first and second port, and data-saving format used in the memory. Thus, the PLC can receive data from the terminal device, or can transfer predetermined data to the terminal device through the input/output controller of the present invention.

17 Claims, 3 Drawing Sheets

EXTENSION UNIT FOR PLC SYSTEM AND I/O CONTROLLER THEREOF

BACKGROUND OF THE INVENTION

1. Field of the Invention

The present invention relates to an extension unit for a programmable logic controller, and in particular to an extension unit utilizing an extensive input/output controller to communicate with digital terminals or analog terminals.

2. Description of the Related Art

Programmable logic controllers (PLCs) are a relatively recent development in process control technology. As a part of process control, a PLC is used to monitor input signals from a variety of input terminals (input sensors) which report events and conditions occurring in a controlled process. For example, a PLC can monitor input conditions such as motor speed, temperature, pressure, volumetric flow and the like. A control program is stored in a memory within the PLC to instruct the PLC what actions to take upon encountering particular input signals or conditions. In response to these input signals received from input sensors, the PLC derives and generates output signals which are transmitted via PLC output points to various output devices, such as actuators and relays, to control the process. For example, the output signals generated by the PLC are used to speed up or slow down a conveyer, rotate the arm of a robot, open or close a relay, raise or lower temperature as well as many other possible control functions.

Because conventional PLC system do not have a standard communication interface for external controlled peripherals, hardware engineers must re-design a specific peripheral control interface according to each peripheral unit and data-transmitting format in each application. After the peripheral control circuit is finished, software engineers must write a specific control program according to the peripheral control circuit. The above design process is extremely reliant on the cooperation of hardware and software engineers, who may easily create errors and always take a long time to debug the PLC system. Thus, the conventional PLC system cannot be expanded quickly and flexibly.

Furthermore, when the conventional PLC system includes an extension unit having a display module with multiple 7-segment binary coded decimal (BCD) LEDs or a scan-type keyboard module, a large number of pins of the conventional PLC system must be used to simulate the input/output pins of the display module or the keyboard module. The relative control program saved in the PLC system must be modified case by case. Thus, the peripheral control circuit is complicated, and the fabrication cost is expensive.

SUMMARY OF THE INVENTION

Accordingly, an object of the invention is to provide an extension unit with a standard communication interface, or I/O controller, for the conventional PLC system. The conventional PLC system can communicate with the digital or analog terminal devices in the extension unit via the standard communication interface. The extension units with different terminal devices can be preset as different modules, which can reduce the difficulty of fabrication and shorten the modification time.

The present invention provides an input/output controller for an extension unit of a programmable logic controller. The input/output controller has a first port with a plurality of first pins connected to the programmable logic controller and a second port with a plurality of second pins connected to a terminal device. A memory is used to save data received from the first port and the second port. A mode-selecting circuit of the input/output controller includes a plurality of preset operation modes, which determines the input or output type of the first port and the second port, data-transmitting format used by the first and second port, and data-saving format used in the memory.

In a preferred embodiment, the input/output controller further includes a superior serial port and an inferior serial port to connect another two input/output controllers in serial.

Moreover, the input/output controller includes a scan port with a plurality of scan pins. When the mode-selecting circuit is in a scan output mode, data saved in the memory can be transmitted to the terminal device through the second port cooperating with the scan port. When the mode-selecting circuit is in a scan input mode, data in the terminal device can be read through the second port cooperating with the scan port and saved in the memory.

Moreover, the input/output controller includes an analog-to-digital data port and a digital-to-analog data port. When the mode-selecting circuit is in an analog input mode, data in the terminal device can be read through the analog-to-digital data port and saved in the memory. When the mode-selecting circuit is in an analog output mode, data saved in the memory can be transmitted to the terminal device through the digital-to-analog data port.

The present invention also provides an extension unit for a programmable logic controller(PLC). The extension unit includes a terminal device and an input/output controller as described above. Through the input/output controller of the present invention, the PLC can receive data from the terminal device, or can transfer predetermined data to the terminal device.

Furthermore, the terminal device is a display module with a plurality of binary coded decimal 7-segment LEDs, keyboards, thermometers, or heaters.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 1:
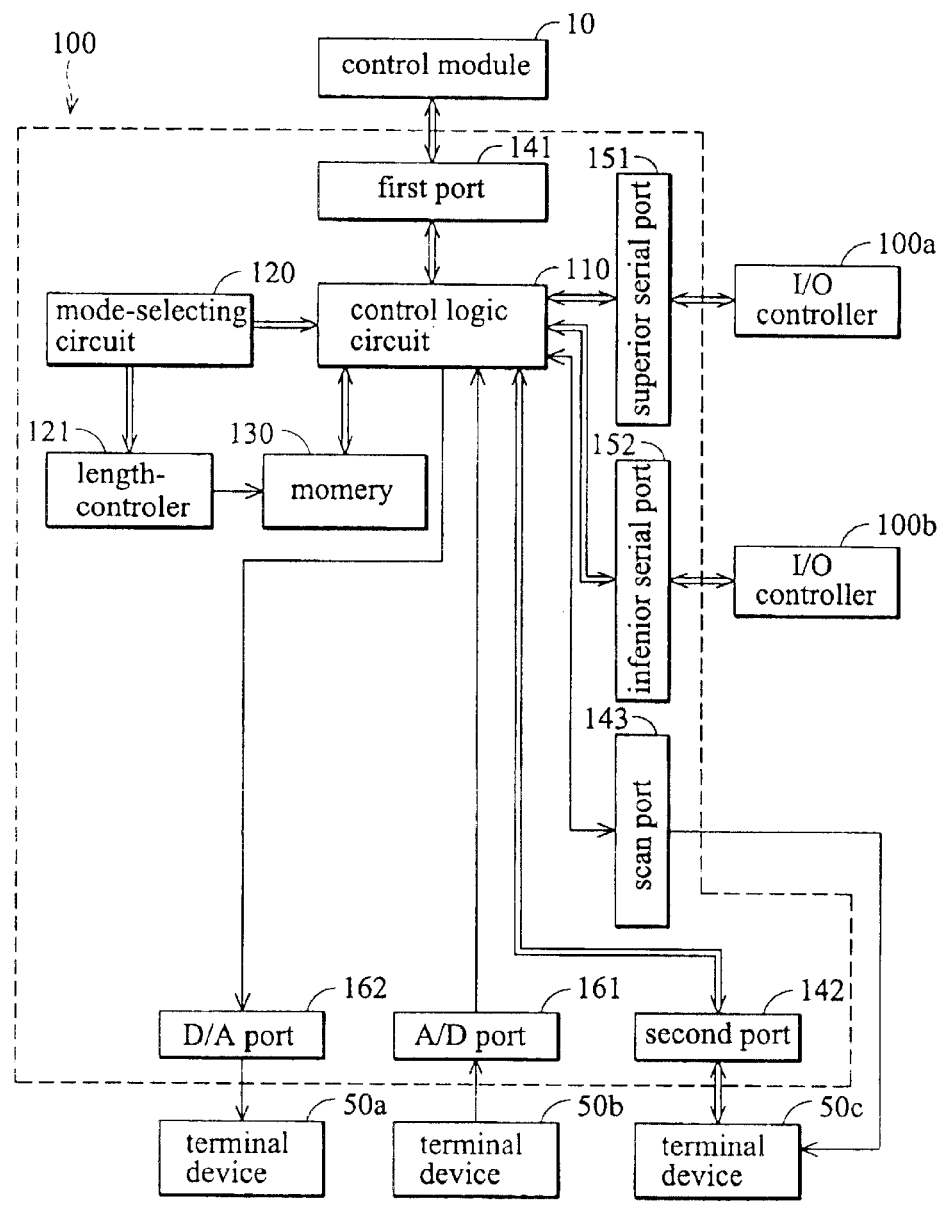
FIG. 1 is a block diagram of an input/output controller for extension units of a PLC of the present invention.

FIG. 1 illustrates a block diagram of an input/output (I/O) controller for extension units of a PLC. In FIG. 1, the I/O controller 100 of the present invention is electrically connected to the control module 10 of a PLC system and controlled terminal devices 50*a*~50*c*, providing a standard communication interface for the control module 10 and the terminal devices 50*a*~50*c*.

The I/O controller 100 has a first port 141 with a plurality of first pins (not shown) connected to the control module 10 of the PLC system to receive control commands from the control module 10 or transmit data from the terminal devices 50a~50c to the control module 10. The I/O controller 100 also has a second port 142 with a plurality of second pins (not shown) connected to a terminal device 50c. A memory 130 is used to temporarily save data received from the first port 141 and the second port 142. A mode-selecting circuit 120 of the I/O controller 100 includes a plurality of preset operation modes. According to the terminal devices connected to the I/O controller 10, the mode-selecting circuit 120 determines the control mode of the control logic circuit 110, the used pin number, the transmission direction and data-transmitting format of the first and second port 141,142 by a predetermined external circuit(not shown) or mode-controlling signals from the control module 10 of the PLC system. The data-saving format and the relative saving address used in the memory 130 are also determined by the mode-selecting circuit 120 through a length-controlling unit 121.

In FIG. 1, the I/O controller 100 further includes a superior serial port 151 and an inferior serial port 152 to connect another two I/O controllers 100a and 100b in serial, transmitting data to each other and increasing the usage flexibility of the I/O controller 100.

The I/O controller 100 further includes a scan port 143 with a plurality of scan pins (not shown) When the mode-selecting circuit 120 is set in a scan output mode by an external circuit or control signals, data saved in the memory 130 from the control module 10 can be transmitted to the terminal device 50c through the second port 142 cooperating with the scan port 143. When the mode-selecting circuit 120 is set in a scan input mode by the external circuit or control signals, the condition data of the terminal device 50c can be read through the second port 142 cooperating with the scan port 143 and temporarily saved in the memory 130. Next, the condition data are transmitted to the control module 10 through the first port 141. Otherwise, the condition data can be transmitted to another cooperating I/O controller (100a or 100b) through the superior serial port 151 or the inferior serial port 152, and then transmitted to the control module 10 by the first port thereof.

Moreover, the I/O controller 100 includes an analog-to-digital data port 161 and a digital-to-analog data port 162. When the mode-selecting circuit 120 is set in an analog input mode by an external circuit or control signals, data saved in the terminal device 50b can be read through the analog-to-digital data port 161 and saved in the memory 130. For example, when the terminal device 50b used in an extension unit is an analog sensor such as a thermometer (ex: thermocouple) or a pressure gauge (ex: piezoelectric crystal), the control module 10 can monitor the condition data from the analog sensor of the extension unit through the analog-to-digital data port 161 of the I/O controller 100.

In response to the input condition data received from analog sensors, the control module 10 of the PLC system generates output commands which are transmitted through the first port 141 to the I/O controller 10, saved in the memory 130, to control the process.

For example, the output signals generated by the PLC are used to speed up or slow down a conveyer, rotate the arm of a robot, open or close a relay, raise or lower temperature as well as many other possible control functions. When the mode-selecting circuit 120 is set in an analog output mode, the control commands are temporarily saved in the memory 130 through the first port 141 and transmitted to the analog terminal device 50a through the digital-to-analog data port 162. Thus, the analog terminal devices 50a in extension units such as heaters, valves or other analog controlled devices can be analogically controlled by the control module 10 of PLC system through the I/O controller 100 of the invention.

Second Embodiment

Figure 2:
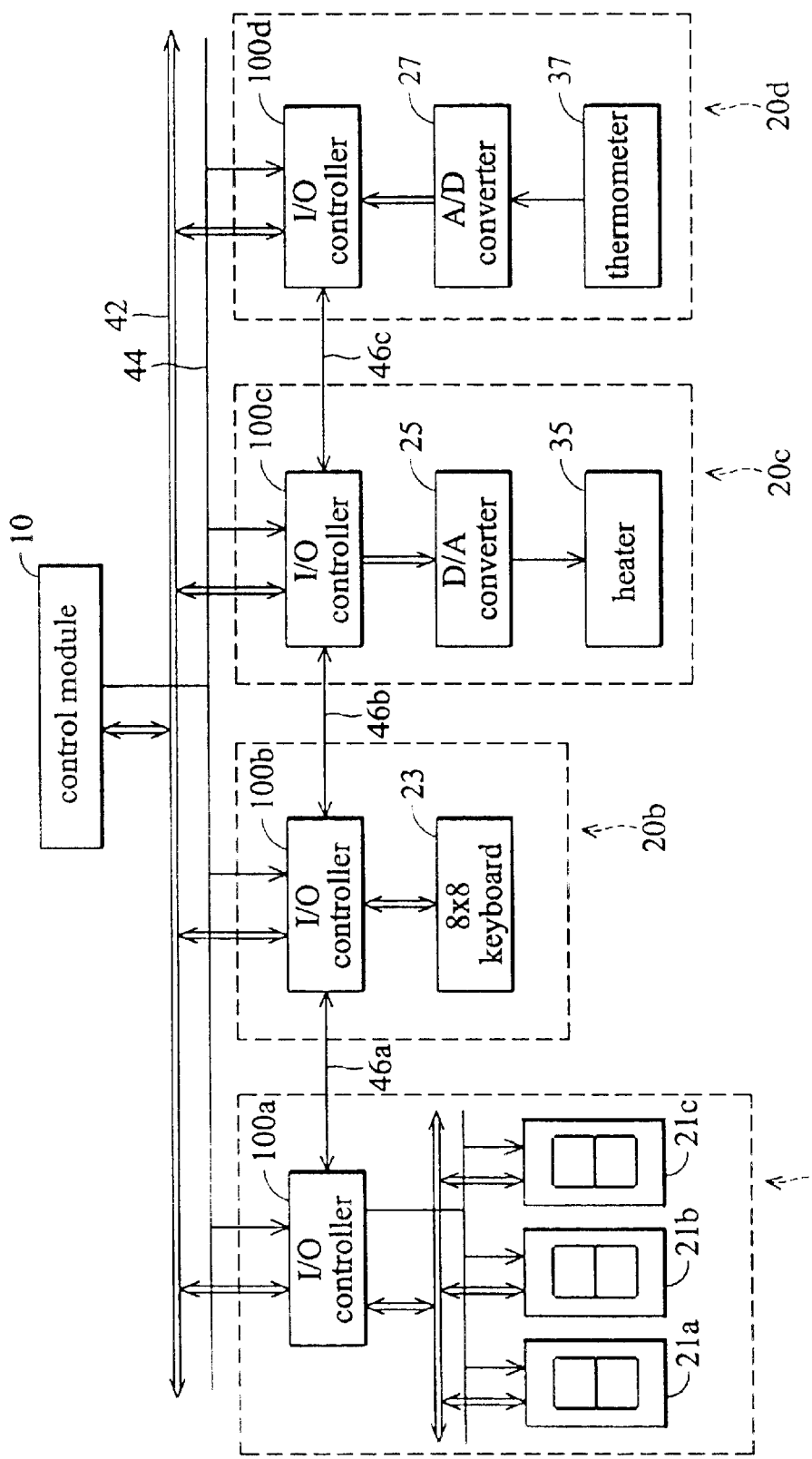
FIG. 2 is a schematic block diagram illustrating multiple extension units controlled by the PLC of a temperature control device.

FIG. 2 shows a plurality of extension units controlled by a PLC system. In FIG. 2, the control module 10 of the PLC system controls the extension units 20a~20d and communicates with the I/O controllers 100a~100d through a data bus 42. The data bus 42 further includes unit-selecting pins by which to enable one of the extension units 20a~20d, to receive control commands. Moreover, each two extension units 20a~20d are connected in serial by serial circuits 46a~46c, such that the extension units 20a~20d cooperate with each other, increasing the usage flexibility of the PLC system.

The extension unit 20a has an I/O controller 100a controlling three 7-segment BCD LEDS 21a~21c by the scan input or scan output port. The extension unit 20b includes an I/O controller 100b and a 8×8 scan-type keyboard 23. The I/O controller 100b continuously monitors the keyboard 23 through the scan port and the second port, and transmits the input data to the control module 10.

According to the temperature control system of the second embodiment shown in FIG. 2, the terminal devices are a thermometer 37 and a heater 35. First, the control module 10 generates a temperature-reading command to the I/O controller 100d. When the I/O controller 100d receives the temperature-reading commands, the I/O controller 100d reads a digital temperature data converted from a analog temperature signal sensed by the thermometer 37 through an A/D converter 27. Then, the digital temperature data are transmitted to the control module 10. In response to the input signals, the control module 10 generates a control command which is transmitted through the data bus 42 to the I/O controller 100c of the extension unit 20c. The control command is converted into an analog voltage signal by the D/A converter 25 and transmitted to the heater 35, heating the system to a predetermined temperature.

Figure 3:
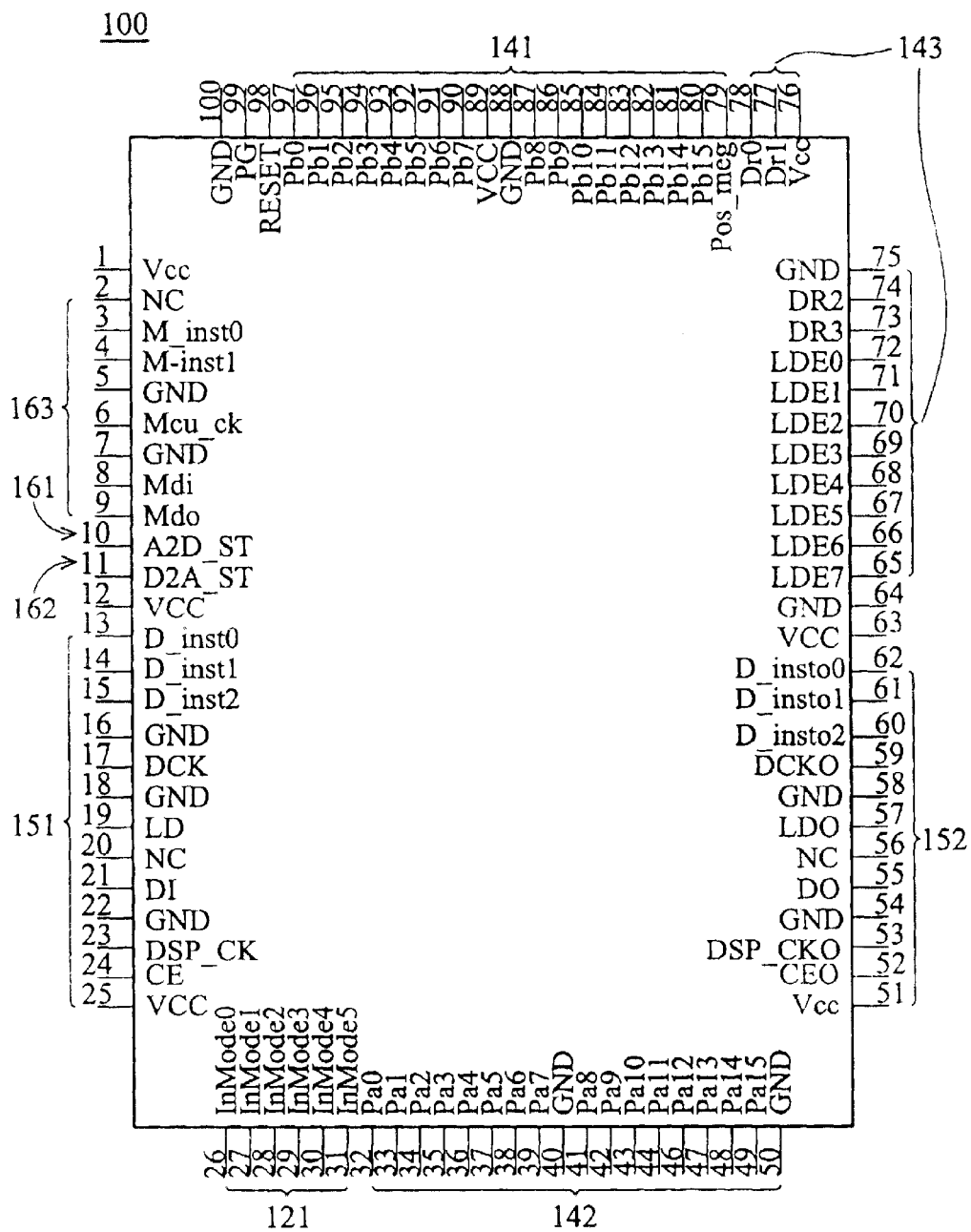
FIG. 3 is a pin diagram of the input/output controller of the present invention.

FIG. 3 is a pin diagram of the I/O controller of the present invention. In FIG. 3, the I/O controller 100 includes a first port 141 (Pb0~Pb15) and a second port 142 (Pa0~Pa15), which are separately connected to the control module of the PLC system and terminal devices. The I/O controller 100 can be set in several operation mode by a plurality of mode-selecting pins 163 of the mode-selecting circuit thereof. Moreover, the I/O controllers 100 of the present invention can be connected in serial through the superior serial port 151 and the inferior serial port 152. When the I/O controller 100 is set in the scan input mode, the I/O controller 100 continuously monitors the keyboard and 7-segment BCD LEDs through the scan port 143 and the second port 142. Similarly, the I/O controller monitors input signals from analog terminal devices or transmit control commands to analog terminal devices through the analog-to-digital data port 161 or the digital-to-analog data port 162.

The I/O controller of the present invention provides a unified and standard communication interface for the conventional PLC system. The control module of a PLC system can communicate with controlled terminal devices through the I/O controller in each extension unit. Thus, the extension units and the relative control programs can easily be modulized to reduce the fabrication difficulty and shorten the modification time. Moreover, the I/O controller of the present invention integrates different data ports. Thus, the I/O pins of the PLC and the peripheral circuit are reduced and the fabrication cost thereof is also reduced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An input/output controller connected to a control module and a terminal device, comprising:
   a first port connected to the control module;
   a second port connected to the terminal device;
   a memory for saving data from the first port and the second port; and
   a mode-selecting circuit, including a plurality of preset operation modes, which determine the input or output type of the first port and the second port, data-transmitting formats used by the first and second port, and data-saving formats used in the memory.

2. The input/output controller as claimed in claim 1, further comprising a superior serial port and an inferior serial port to connect another two input/output controllers in serial.

3. The input/output controller as claimed in claim 1, further comprising a scan port, when the mode-selecting circuit is in a scan output mode, data saved in the memory is transmitted to the terminal device through the second port cooperating with the scan port.

4. The input/output controller as claimed in claim 3, wherein when the mode-selecting circuit is in a scan input mode, data in the terminal device is read through the second port cooperating with the scan port and saved in the memory.

5. The input/output controller as claimed in claim 1, further comprising an analog-to-digital data port, when the mode-selecting circuit is in an analog input mode, data in the terminal device is read through the analog-to-digital data port and saved in the memory.

6. The input/output controller as claimed in claim 1, further comprising a digital-to-analog data port, when the mode-selecting circuit is in an analog output mode, data saved in the memory is transmitted to the terminal device through the digital-to-analog data port.

7. An extension unit for a programmable logic controller, comprising:
   a terminal device;
   an input/output controller, comprising:
      a first port connected to the programmable logic controller;
      a second port connected to the terminal device;
      a memory for saving data from the first port and the second port; and
      a mode-selecting circuit, including a plurality of preset operation modes, which determines input or output type of the first port and the second port, data-transmitting format used by the first and second port, and data-saving format used in the memory.

8. The extension unit as claimed in claim 7, further comprising a superior serial port and an inferior serial port to connect another two input/output controllers in serial.

9. The extension unit as claimed in claim 7, further comprising a scan port, when the mode-selecting circuit is in a scan output mode, data saved in the memory is transmitted to the terminal device through the second port cooperating with the scan port.

10. The extension unit as claimed in claim 9, wherein the terminal device is a display module with a plurality of binary coded decimal 7-segment LEDs.

11. The extension unit as claimed in claim 7, wherein when the mode-selecting circuit is in a scan input mode, data in the terminal device is read through the second port cooperating with the scan port and saved in the memory.

12. The extension unit as claimed in claim 11, wherein the terminal device is a keyboard.

13. The extension unit as claimed in claim 11, wherein the terminal device is a display module with a plurality of binary coded decimal LED displays.

14. The extension unit as claimed in claim 7, further comprising an analog-to-digital data port, when the mode-selecting circuit is in an analog input mode, data in the terminal device is read through the analog-to-digital data port and saved in the memory.

15. The extension unit as claimed in claim 14, wherein the terminal device is a thermometer.

16. The extension unit as claimed in claim 7, further comprising a digital-to-analog data port, when the mode-selecting circuit is in an analog output mode, data saved in the memory is transmitted to the terminal device through the digital-to-analog data port.

17. The extension unit as claimed in claim 16, wherein the terminal device is a heater.

* * * * *